No. 842,533.
PATENTED JAN. 29, 1907.
E. J. DOWNEY & J. A. DAVIS.
CLUTCH.
APPLICATION FILED JULY 5, 1906.
2 SHEETS—SHEET 1.
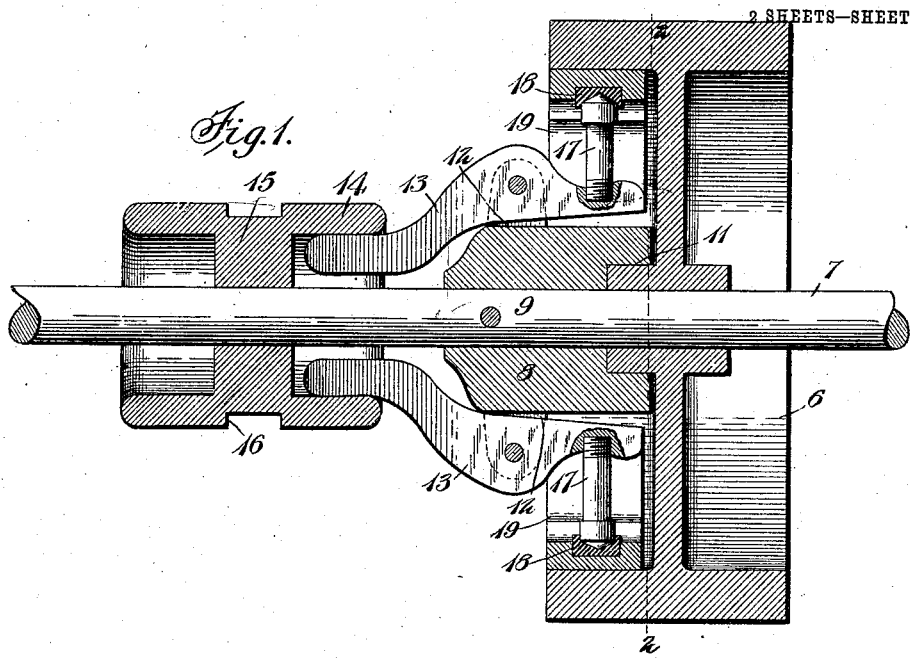
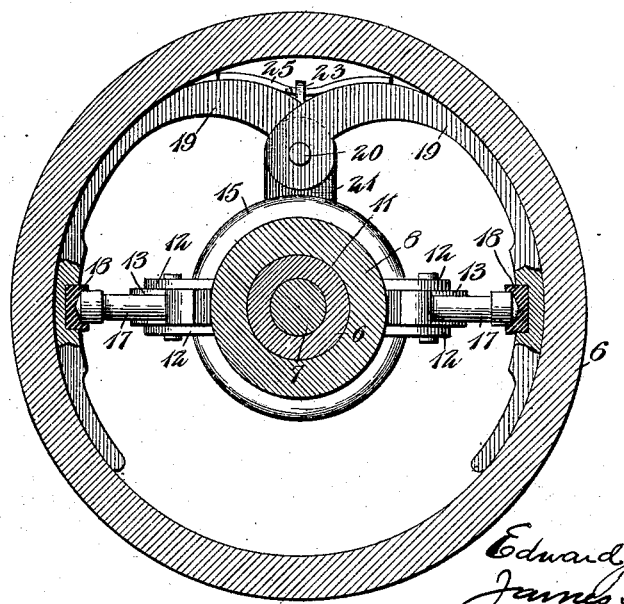

No. 842,533. PATENTED JAN. 29, 1907.
E. J. DOWNEY & J. A. DAVIS.
CLUTCH.
APPLICATION FILED JULY 5, 1906.
2 SHEETS—SHEET 2.
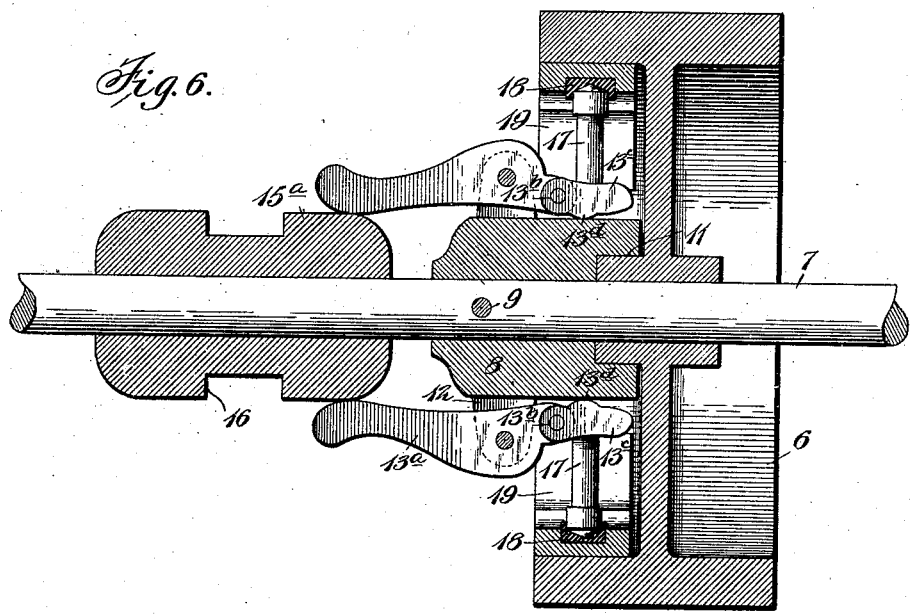
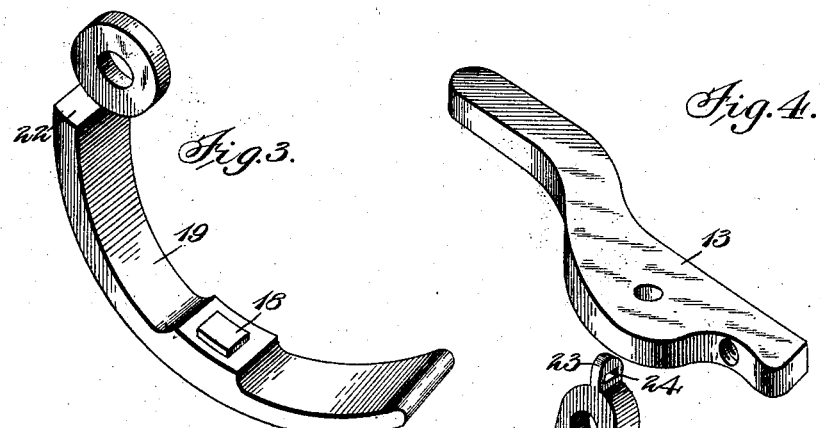
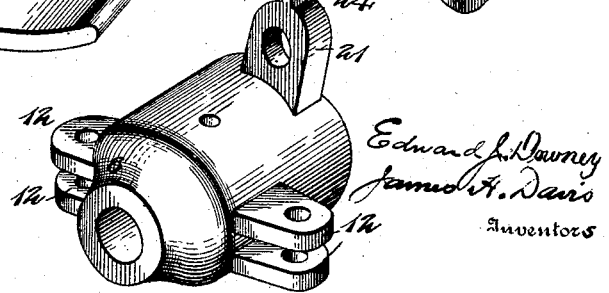

UNITED STATES PATENT OFFICE.

EDWARD J. DOWNEY AND JAMES A. DAVIS, OF CLEVELAND, OHIO.

CLUTCH.

No. 842,533.     Specification of Letters Patent.     Patented Jan. 29, 1907.

Application filed July 5, 1906. Serial No. 324,790.

*To all whom it may concern:*

Be it known that we, EDWARD J. DOWNEY and JAMES A. DAVIS, citizens of the United States, residing at Cleveland, in the county of Cuyahoga and State of Ohio, have invented new and useful Improvements in Clutches, of which the following is a specification.

This invention is a clutch designed particularly for coupling a pulley to a shaft, and has for its object to provide an improved friction-clutch capable of easy manipulation and quick and positive action.

In the accompanying drawings, wherein the invention is illustrated, Figure 1 is a longitudinal section of the clutch. Fig. 2 is a cross-section on the line 2 2 of Fig. 1. Figs. 3, 4, and 5 are details in perspective of parts of the clutch. Fig. 6 is a longitudinal section of a modified form particularly suitable for heavy work.

Referring specifically to the drawings, 6 indicates a pulley loose on the shaft 7. The rim of this pulley receives the contact of the friction members of the clutch against its inner surface.

The clutch-block is indicated at 8, sleeved over the shaft and fastened thereon by a pin 9 or otherwise. The end of the block toward the pulley is recessed, as at 11, to receive the hub of the pulley. This block has on opposite sides ears 12, between which are pivoted opposite levers 13, which swing in or out to operate the friction-pieces. The tails of these levers project in proper position to enter within the annular flange 14 of a sliding spool 15, sleeved on the shaft, and this spool has a peripheral groove 16 to receive the fork of an ordinary shifting-lever, (not shown,) by means of which the spool is shifted along the shaft in a well-known manner to operate the levers.

The opposite or inner ends of the levers project into the space within the rim of the pulley and carry radially-extending bolts 17, the feet of which screw into the inner ends of the levers 13 and which can accordingly be adjusted in or out to desired position, and the heads of which are in contact with rubber disks 18, set in the segmental or curved friction-arms 19, so that as the levers are swung out the arms are forced into contact with the inner surface of the pulley-rim. The rubber disks 18 provide a yielding pressure.

The arms 19 have a proper segmental shape or contour to contact with a large surface of the pulley-rim, so as to give sufficient friction to drive the parts under ordinary load. These arms are both pivoted at one end, as at 20, to opposite sides, respectively, of a lug 21, projecting from one side of the block 8 at a right angle to the ears 12, thereby forming a hinge-joint which allows the arms to swing in or out.

The arms are offset near their inner ends to form shoulders 22, which are properly positioned to extend on opposite sides of a projection 23 at the top of the lug 21, and said projection is slotted, as at 24, to receive a flat spring 25, which extends across and bears on the outer side of both arms and tends to normally throw said arms out of contact with the pulley-rim, or, in other words, to release the clutch.

The pressure effected by the manipulation of the levers 13 will be sufficient to couple the shaft and pulley for ordinary or light work. For heavy work the construction shown in Fig. 6 is employed. This embodies the same parts as above described, with the exception that the operating-levers $13^a$ are pivotally connected, as at $13^b$, to short levers or rockers $13^c$, which carry the set-screws or bolts 17. These rockers have cam-surfaces $13^d$ resting upon the block 8, and when the main levers $13^a$ are actuated a powerful leverage is obtained, which forces the friction-arms against the pulley-rim with greater pressure and is so suitable for heavy work. The levers $13^a$ instead of being drawn in to throw in the clutch are forced out by means of a tapered spool $15^a$, slidable lengthwise on the shaft, which spool is forced between the arms by the shifting-lever to operate the clutch.

We claim—

1. In a clutch for a pulley, in combination, a block on the pulley-shaft, having a lug projecting at one side thereof, friction-arms pivoted to the lug and extending in opposite directions therefrom toward the pulley-rim, a spring secured to the end of the lug and bearing at opposite ends against the outer sides of the arms, and means to force the arms outwardly against said rim.

2. In a clutch for a pulley, in combination, a block on the pulley-shaft, a friction-arm pivotally connected at one end to the block, and extending toward the pulley-rim and adapted to swing in contact therewith, a lever fulcrumed on the block and having an adjustable bolt the foot of which is screwed into the lever and the head of which bears against said arm, and means to operate the lever.

3. In a clutch for a pulley, in combination, a block on the pulley-shaft, a friction-arm pivoted to the block and extending toward the pulley-rim, a lever fulcrumed on the block, a rocker resting against the block and connected at one end to the lever and at the other end to the arm, and means to operate the lever.

In testimony whereof we have signed our names to this specification in the presence of two subscribing witnesses.

EDWARD J. DOWNEY.
  JAMES A. DAVIS.

Witnesses:
 JOHN A. BOMMHARDT,
 SHIRLEY J. BOMMHARDT.